United States Patent [19]

Tsukada et al.

[11] 4,043,618
[45] Aug. 23, 1977

[54] BEARING DEVICE

[75] Inventors: Tameyasu Tsukada, Tokyo; Yoshio Sumi, Yokohama; Yoshinaga Moriwaki, Yokohama; Hirosuke Oshio, Yokohama; Katsunobu Ueda, Yokohama; Yoiti Umino, Fujisawa, all of Japan

[73] Assignee: Tokyo Shibaura Electric Co., Ltd., Kawasaki, Japan

[21] Appl. No.: 689,515

[22] Filed: May 24, 1976

[30] Foreign Application Priority Data

May 26, 1975  Japan ............................. 50-69676[U]
Mar. 25, 1976  Japan ............................. 51-31936

[51] Int. Cl.$^2$ ........................................... F16C 19/14
[52] U.S. Cl. ................................................... 308/174

[58] Field of Search ................. 308/72, 140, 169, 170, 308/174, 175, 176

[56] References Cited

U.S. PATENT DOCUMENTS

| 3,201,181 | 8/1965 | Cherubim | 308/170 X |
| 3,203,742 | 8/1965 | McCarty et al. | 308/174 |

Primary Examiner—Joseph F. Peters, Jr.
Assistant Examiner—Gene A. Church
Attorney, Agent, or Firm—Cushman, Darby & Cushman

[57] ABSTRACT

A bearing device comprising a rotatable shaft, a spherical body fixed to said shaft, a bearing body having a spherical concave bearing face corresponding to said spherical body, and a radial bearing for supporting said shaft at a position spaced apart from said bearing body.

6 Claims, 3 Drawing Figures

BEARING DEVICE

This invention relates to a bearing device, and more particularly to a high precision bearing device for use in a precision machine tool, a precision measuring instrument or the like. But this invention is not limited to application thereto and is applicable to any device required to undergo high precision rotation.

Conventionally, various types of bearing devices are known which include a plain bearing, a rolling bearing, a fluid bearing, etc. Many of these bearing devices each have only either one of radial bearing function and thrust bearing function. Further, a conventional tapered roller bearing or pivot ball bearing is so designed as to receive a radial load and a unidirectional thrust load but is incapable of receiving both thrust loads acting thereon in mutually opposite directions, respectively. Usually, therefore, a bearing assembly consisting of a combined unit of at least one radial bearing and two thrust bearings is used to make it possible to receive a radial load and both thrust loads.

In a rotating mechanism having this type of bearing assembly, a frictional heat evolved at the contact section between a bearing and a shaft is radiated through both of the shaft and a housing for the bearing. Generally, heat radiation is better effected from the housing than from the shaft. As a result, the inner race and rolling elements of the bearing are heated to a higher temperature than the outer race of the bearing. The resulting heat causes an axial expansion of the shaft, for which reason a thrust bearing is required to undergo specific measures such as those so taken as to permit the formation of an axial clearance therein or as to permit the reception of a preliminary pressure therein by means of a spring.

Accordingly, the object of the invention is to provide a structurally simplified bearing device capable of receiving a radial load and both of mutually opposite thrust loads and almost free from the effect by a thermal expansion of the shaft and having a self-aligning function.

The bearing device according to the invention comprises a spherical body fixed to a rotatable shaft, a bearing body having a concave bearing face supportng the spherical body so as to permit it to be rocked about a center axis of the shaft, said concave bearing face having a plurality of spherical body supporting points situated on a spherical concave surface corresponding to the spherical body, and a radial bearing for supporting the shaft at a position spaced apart from the spherical body.

In the foregoing construction, both of the mutually opposite thrust loads are received in the bearing body, while the radial load is received in both of the bearing body and the radial bearing. The shaft, even when thermally expanded, is freely extended by being passed through the radial bearing. Specific measures, therefore, are not required to be taken toward such thermal expansion of the shaft. Further, the center of the spherical body coincides with the center of the spherical surface formed by said plurality of supporting points of the bearing body. Accordingly, the bearing device has a self-aligning function.

This invention can be more fully understood from the following detailed description when taken in conjunction with the accompanying drawings, in which.

Figure 1:
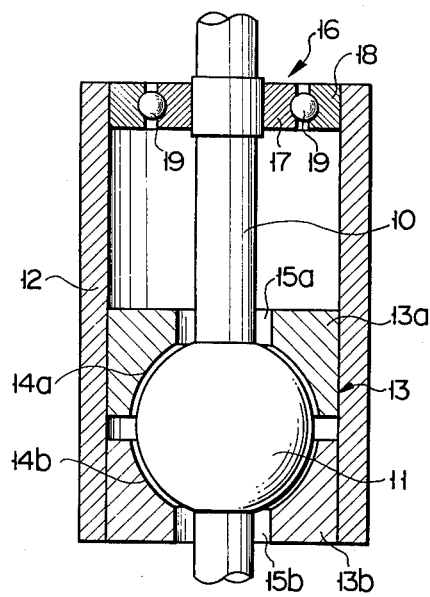
FIG. 1 is a longitudinal sectional view of a bearing device according to an embodiment of the invention.

FIG. 1 shows a bearing device according to a simple embodiment of the invention. The bearing device of FIG. 1 comprises a rotatable shaft 10 and a substantially spherical body 11 fixed to the shaft 10 and having its own center located on a center line of the shaft 10. The spherical body 11 is rotatably supported by a bearing body 13 secured to an inner wall of a housing 12 and constitutes a sphere bearing jointly with the body 13. The bearing body 13 consists of an upper half 13a and a lower half 13b which have, respectively, semi-spherical concave bearing faces 14a and 14b for supporting the outer peripheral upper half portion and the outer peripheral lower half portion of the spherical body 11, respectively. Both bearing faces 14a and 14b are complementarily fitted over the spherical body 11 to describe a spherical face. The upper half 13a and lower half 13b have holes 15a and 15b for permitting free passage therethrough of the shaft 10, respectively. A radial bearing 16 secured to the housing 12 rotatably supports the shaft 10 at a position spaced from the spherical body 11. The radial bearing 16 includes an inner race 17 fitted to the shaft 10, an outer race 18 fitted to the housing 12, and balls 19 disposed between both races 17 and 18 so as to be subject to free rolling.

Upon rotation of the shaft 10 about an axis thereof, the spherical body 11 is allowed to slidably rotate on the bearing faces 14a and 14b of the bearing body 13, while the shaft 10 is journaled by the radial bearing 16. Mutually opposite thrust loads are received by the bearing body 13, while a radial load is received by the bearing body 13 and the radial bearing 16. Since the center of the spherical body 11 coincides with the center of the bearing faces 14a and 14b, the spherical body 11 is self-aligned with respect to the shaft 10 even where the shaft 10 is slightly inclined.

Actually, in order to make small the friction between the spherical body 11 and the bearing body 13 a lubricating oil can be interposed between the respective contact faces of both bodies 11 and 13. Further, as in a later described embodiment, a fluid having a specified pressure may also be supplied between said respective contact faces.

Figure 2:
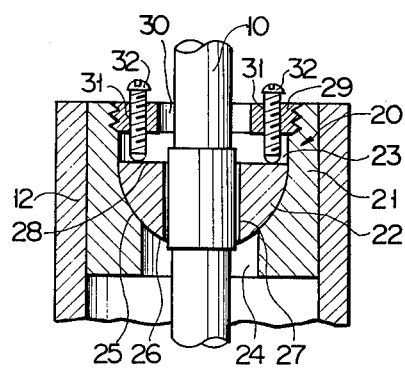
FIG. 2 is a sectional partial view of a modification of the radial bearing of the bearing device shown in FIG. 1.

FIG. 2 shows a bearing device having a modified radial bearing. The sphere bearing of this device is the same as that of the device shown in FIG. 1, and therefore is omitted from FIG. 2. A radial bearing 20 of FIG. 2 comprises a supporting member 21 fixed to an inner wall of the housing 12, and a bearing member 22 rotatably supporting the shaft 10. The supporting member 20 is bored with a large-diameter hole 23 and a small-diameter hole 24 which are both sufficiently larger in diameter than the shaft 10, and has a semi-spherical concave support face 25 at that portion of the boundary area between both holes 23, 24 which belongs to the large-diameter hole 23. The bearing member 22 has a semi-spherical convex face 26 complementarily resting on the support face 25. At the center of the bearing member 22 is punctuated a hole 27 for permitting the shaft 10 to be rotatably passed therethrough, an inner wall of said hole 27 constituting a radial bearing face. Further, the bearing member 22 has an upper smooth face 28 intersecting the center axis of the shaft 10 at right angles thereto.

The inner wall of the large-diameter hole 23 of the supporting member 20 is provided with an internal thread portion, to which an externally threaded disk 29 is fitted by screw engagement. The disk 29 has at its center a hole 30 for permitting face passage therethrough of the shaft 10, and has at the peripheral portion, for example three screw holes 31 (in FIG. 2, only two are shown) spaced equiangularly from each other. Adjusting screws 32 are screwed into the screw holes 31, respectively, and the respective lower ends of the adjusting screws 32 are in abutment with the upper face 28 of the bearing member 22.

Upon assembling the device, the centering of the radial bearing 20 with respect to the shaft 10 can with ease be carried out by slidably rolling the bearing member 22 on the semi-spherical convex face 26 by means of the adjusting screws 32. For this reason, the fabrication of the shaft 10 and the housng 12 and the assembling thereof are not required to be performed with so high a precision and therefore can be extremely simplified.

Figure 3:
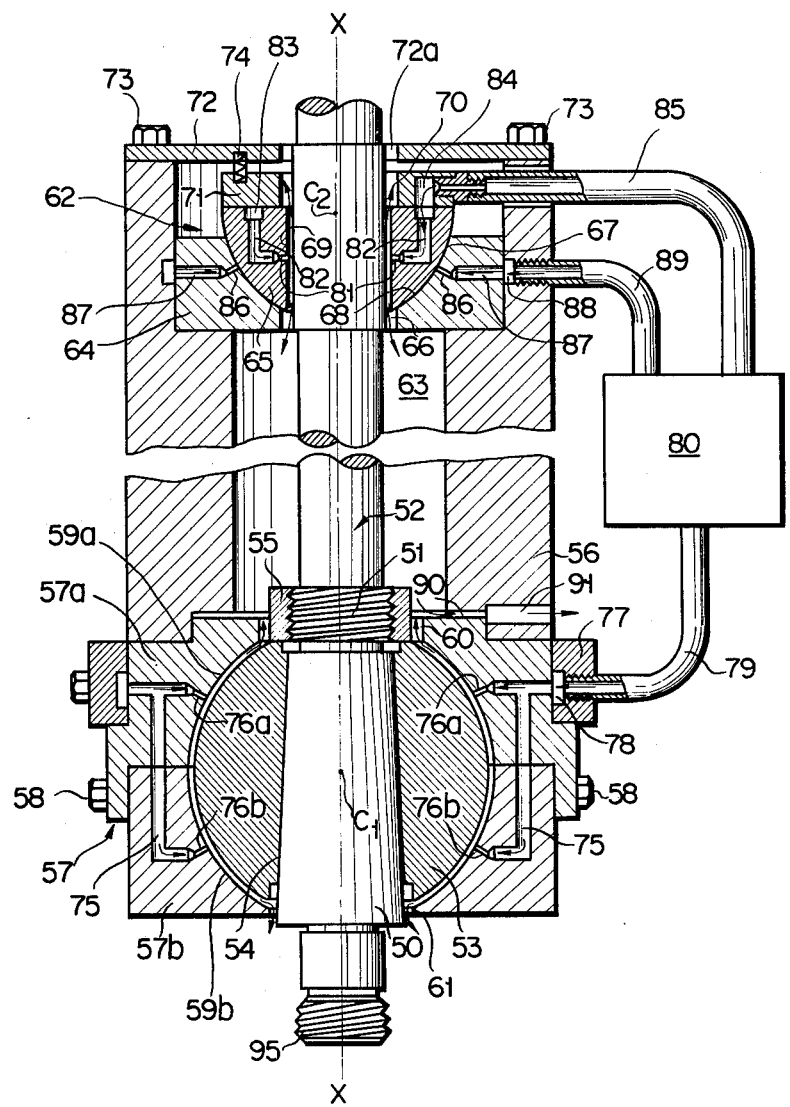
FIG. 3 is a more detailed longitudinal sectional view of the bearing device according to another embodiment of the invention.

FIG. 3 shows the bearing device according to a more practical embodiment of the invention. The device of FIG. 3 comprises a rotatable shaft 52 having an upwardly tapered section 50 and an external thread section 51. A spherical body 53 having a substantially spherical outer periphery has at its center a tapered hole 54 fitted to the tapered section 50 of the shaft 52, and is fixed to the shaft 52 by a nut 55 screwed over the external thread section 51, so as to permit a center point $C_1$ of the spherical body 53 to be brought to a center axis X—X of the shaft 52. The bearing device further comprises a hollow housing 56, and to a lower end of the housing 56 is fixed by a screw (not shown) a bearing body 57 for supporting the spherical body 53 so as to permit it to rotate about said axis X—X. The spherical body 53 and the bearing body 57 constitute a sphere bearing in cooperation with each other. The bearing body 57 consists of an upper half 57a and a lower half 57b which are secured to each other by screws 58. The upper half 57a and the lower half 57b have substantially semi-spherical concave bearing faces 59a and 59b, respectively, and both bearing faces 59a and 59b forms a substantially spherical concave face surrounding the outer periphery of the spherical body 53 with a small clearance interposed therebetween. Further, the upper half 59a and lower half 59b are bored with holes 60 and 61 for permitting free passage therethrough of the nut 55 and the tapered section 50, respectively.

At the upper end of the housing 56 is disposed a radial bearing 62, which rotatably supports the shaft 52 of a position spaced from said sphere bearing. The radial bearing 62 includes a supporting member 64 firmly fitted to the housng 56 at the upper position of a hollow section 63 thereof, and a bearing member 65 rotatably supporting an upper portion of the shaft 52. The supporting member 64 has a through bore 66 sufficiently larger in diameter than the shaft 52, and has a substantially semi-spherical concave recess 67 at the upward part of the through bore 66. The bearing member 65 has at its underside a substantially semispherical convex face 68 supported by the inner wall of the recess 67. Further, the bearing member is bored at its center with a hole 69 for permitting rotatable passage therethrough of the shaft 52, the inner wall of said hole constituting a radial bearing face. The upper surface of the bearing member 65 is formed smooth, and a block 71 having a through bore 70 is fixed to said upper surface by screws (not shown). To an upper end of the housing 56 is fastened through screws 73 an end plate 72 having a through bore 72a. Between the end plate 72 and the block 71 are disposed a plurality of compression springs 74 (in FIG. 3, only one is shown) in a manner spaced equiangularly from each other.

The bearing device of this embodiment further comprises means for feeding a pressurized fluid, especially a compressed air into the interspace between each corresponding two of the above-mentioned bearing faces. To describe in more detail, the bearing body 57 of said sphere bearing has a plurality of, for example, 12 air passages 75, and the upper and lower ends of each passage 75 are provided with nozzles 76a and 76b opened at the bearing faces 59a and 59b, respectively. The nozzles 76a are disposed spaced equiangularly from each other and are directed toward the center $C_1$ of the spherical body 53. The same can be said of the nozzles 76b. A ring member 77 is hermetically fixed to the upper half 57a of the bearing body 57, and an annular groove 78 formed in an inner wall of the ring member 77 permit communication of all air passages 75 with each other. To the ring member 77 is connected a pipe 79 communicating with the annular groove 78, said pipe 79 being connected to a known compressed air supply means 80. The bearing member 65 of the radial bearing 62 is provided with a plurality of air passages 82 each having a nozzle 81 at its lower end. The nozzles 81 are disposed spaced equiangularly from each other, and are opened to the hole 69 so as to be directed in a direction intersecting the center axis X—X of the shaft 52 at right angles thereto. The upper ends of the air passages 82 are interconnected by an annular groove 83. This annular groove 83 communicates with a hole 84 formed in the block 71. To this hole 84 is connected a pipe 85 extended from the compressed air supply means 80.

The bearing device of this embodiment further comprises means for aligning the radial bearing 62 with the shaft 52. To describe more in detail, the supporting member 64 are provided with a plurality of air passages 87 each having a nozzle 86 opened to the semi-spherical concave recess 67. The nozzles 86 are disposed equiangularly form each other and are directed toward the center $C_2$ of the semi-spherical face 68. The air passages 87 are allowed integrally to communicate with each other by means of an annular groove 88 formed in the housing 56 and are supplied with the air from the compressed air supply means 80 through a pipe 89.

The hollow section 63 of the housing 56 communicates with the open air through a clearance 90 provided between the housing 56 and the bearing body 57 and an aperture 91 provided for the housing 56.

When the compressed air is fed into the pipes 79 and 85 from the compressed air supply means 80, it is conducted into the nozzles 76a, 76b and the nozzle 81 through the corresponding air passages 75 and 82. The compressed air ejected from the nozzles 76a and 76b forms a uniform air film between the outer periphery of the spherical body 53 and the bearing faces 59a, 59b to cause the body 53 to be floated from the bearing faces 59a, 59b. For this reason, the center $C_1$ of the spherical body 53 is brought into coincidence with the center of the curvature of the bearing faces 59a, 59b. Subsequently, the compressed air is discharged through the hole 61 and through the hole 60, clearance 90 and aperture 91. The compressed air ejected from the nozzles 81 forms a uniform air film between the inner wall of the hole 69 and the outer wall of the shaft 52 to cause the shaft 52 to be self-aligned with respect to the hole 69, and subsequently is discharged to the open air through the through bores 70 and 66. When, upon start of the operation, the compressed air is supplied from the pipe 89 to the nozzles 86, the bearing member 65 is floated from the recess 67. At this time, the bearing member 65 is automatically aligned with respect to the shaft 52 due to the action of the compressed air sent from the nozzles 81. When, subsequently, the air sent into the pipe 89 is gradually decreased in amount, the bearing member 65 falls due to its own weight in a state centered with respect to the shaft 52, and is thus pressed onto the upper face of the recess 67 by means of the springs 74. During the operation of the bearing device, the compressed air is always fed in from the nozzles 76a, 76b and 81. For this reason, the bearing device functions as a fluid bearing and is suitable especially to high speed rotation.

Where the bearing device is applied to a main spindle of a machine tool, an externally threaded connector 95 is provided at the lower end of the shaft 52, and a tool (not shown) is secured to that connector.

In the above-mentioned both embodiments, the bearing faces of the bearing body are formed into a substantially spherical configuration corresponding to the configuration of the outer periphery of the spherical body. But this bearing face is not limited to such configuration, and may be of any type wherein those supporting points of each bearing face which are desired to support the spherical body are situated on a spherical surface corresponding to the spherical body. For example, a number of balls disposed with high density between the bearing body and the spherical body are able to form such type of bearing face. Otherwise, a substantially spherical equilateral polygonal concave face having a number of fractional faces are also able to form such type of bearing face.

What we claim is:

1. A bearing device comprising a rotatable shaft having a center axis, a spherical body fixed to said shaft to be rotated therewith so as to permit its center point to be brought to said center axis of said shaft, a bearing body having a concave bearing face supporting said spherical body so as to permit it to rotate about said center axis of said shaft, said bearing face having a number of supporting points situated on a spherical surface corresponding to said spherical body to support said spherical body, and a radial bearing for rotatably supporting said shaft at a position spaced apart from said spherical body.

2. A bearing device according to claim 1, which further comprises first pressurized fluid supply means for supplying a pressurized fluid into an interspace between said spherical body and said bearing face.

3. A bearing device according to claim 2, wherein said first pressurized fluid supply means includes a plurality of air ejection nozzles faced to the outer periphery of said spherical body and directed toward said center point of said spherical body.

4. A bearing device according to claim 2, which further comprises second pressurized fluid supply means for supplying a pressurized fluid into an interspace between said shaft and said radial bearing.

5. A bearing device according to claim 2, wherein said radial bearing includes a supporting member whose upper face is a substantially semi-spherical concave face, a bearing member having a substantially semi-spherical convex face complementarily resting on said concave face of said supporting member and a radial bearing face supporting said shaft, and second pressurized fluid supply means for supplying a pressurized fluid into an interspace between said concave face of said supporting member and said convex face of said bearing member.

6. A bearing device according to claim 1, wherein said bearing body includes an upper half and a lower half which have, respectively, semi-spherical concave bearing faces for supporting the outer peripheral upper half portion and the outer peripheral lower half portion of the spherical body.

* * * * *